Oct. 20, 1970     R. W. KALKBRENNER     3,535,059

ROTARY ENGINE VALVE

Filed July 2, 1968     2 Sheets-Sheet 1

INVENTOR.
RALPH W. KALKBRENNER
BY Roland A. Anderson
Attorney

Oct. 20, 1970    R. W. KALKBRENNER    3,535,059
ROTARY ENGINE VALVE

Filed July 2, 1968    2 Sheets-Sheet 2

INVENTOR.
RALPH W. KALKBRENNER
BY Roland A. Anderson
Attorney

United States Patent Office 3,535,059
Patented Oct. 20, 1970

1

3,535,059
ROTARY ENGINE VALVE
Ralph W. Kalkbrenner, Irwin, Pa., assignor, by mesne assignments, to the United States of America as represented by the United States Atomic Energy Commission
Filed July 2, 1968, Ser. No. 742,089
Int. Cl. F01c 1/02
U.S. Cl. 418—60    3 Claims

ABSTRACT OF THE DISCLOSURE

A rotary piston steam engine utilizing a rotating tube to carry steam to the cylinders functioning to deliver cyclically the high pressure steam to all of the cylinders during the proper portion of each cycle. The tube is slotted for this purpose and is driven off the power shaft by a chain and sprocket drive.

BACKGROUND OF THE INVENTION

Recent studies indicate that an artifical human heart supported by an implantable power source is technically feasible, provided the functioning parts of such a system can be made highly miniaturized and reliable. One such system under consideration utilizes a steam engine to drive a water pump which drives hydraulically a mechanical heart.

A rotary piston steam engine operating on the Rankine cycle appears to be the most suitable steam engine for this application because it is highly reliable, capable of great compactness, and lacks many of the deficiencies of the reciprocating piston engine which requires high expansion ratios and can not tolerate the existance of any condensate, in addition to having other disadvantages.

However, an important problem with the rotary piston is that of the valve construction which admits the steam to each engine cylinder. The steam must be admitted through a precise angle of rotation and present designs appear to make the valve the most unreliable and complex portion of the engine. Typically, such valve construction involves a separate cam, follower, bellcrank, connecting link and oscillating valve for each cylinder.

SUMMARY OF THE INVENTION

The invention described herein was made in the course of, or under a contract with the United States Atomic Energy Commission.

The present invention avoids or minimizes many of the aforementioned disadvantages of rotary steam engines in their application to situations requiring great reliability and miniaturization.

In accordance with this invention a unique valve arrangement for a rotary piston engine is employed which is of greater simplicity and at the same time more reliable than the valve arrangements heretofore in use or known. In a preferred embodiment of this invention an elongated tubular element is mounted within the block extending across all of the cylinders. The tubular element is driven directly from the engine shaft and is slotted appropriately to supply vapor to each of the cylinders. Vapor supply for the cylinders is directly through the tubular element itself.

The inventive arrangement reduces the number of moving parts associated with the valving process and relies upon a single rotating member to provide valving for all of the cylinders in the engine. As a result of the simpler arrangement it is readily apparent that the engine is capable of greater compactness or miniaturization than such engines heretofore available.

2

It is thus a principal object of this invention to provide an improved rotary piston engine of improved reliability capable of great compactness.

Other objects and advantages of this invention will become readily apparent from the following description of a preferred embodiment of this invention given with reference to the accompanying drawings.

DESCRIPTION OF THE PREFERRED EMBODIMENT

Figure 1:
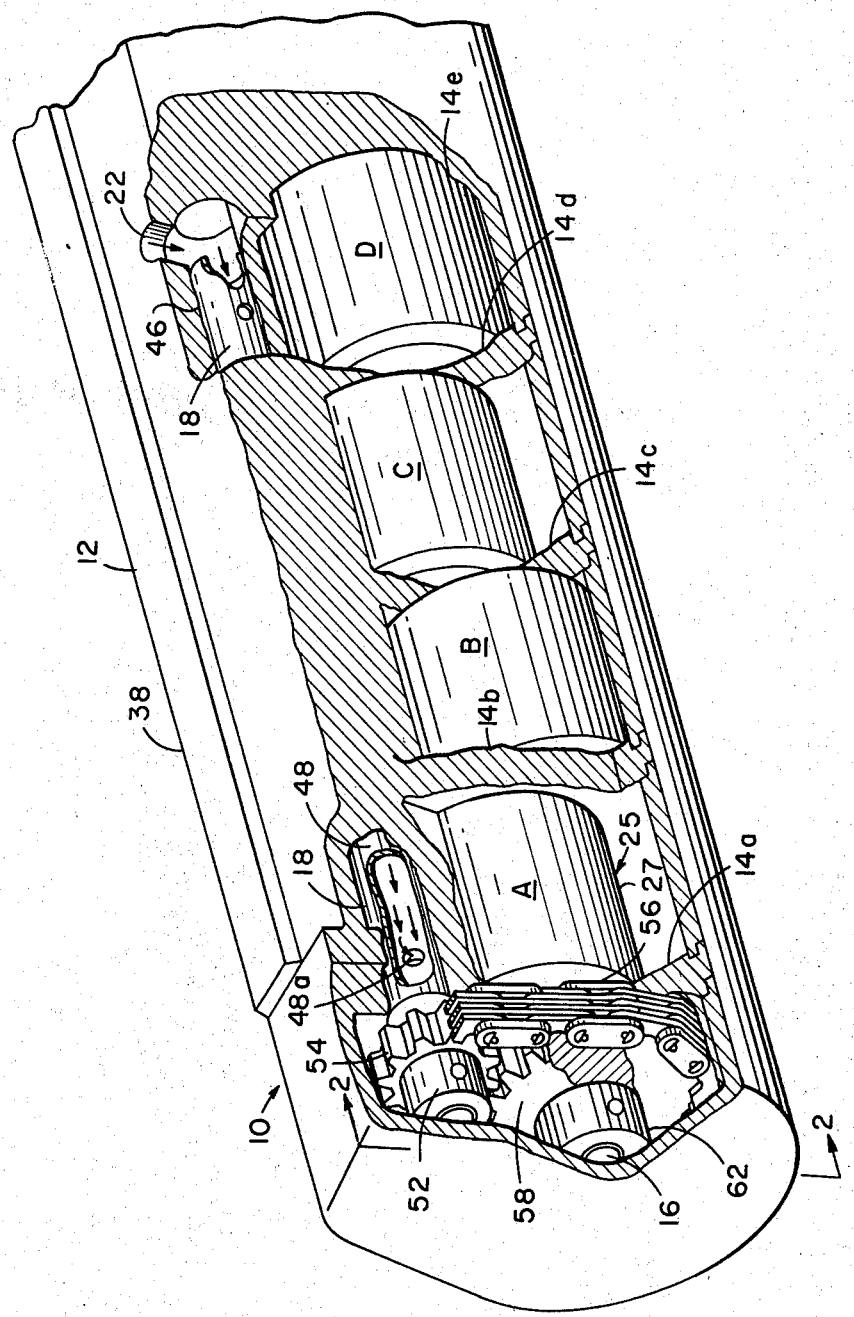
FIG. 1 is an isometric view in partial section showing a preferred embodiment of this invention.
Figure 2:
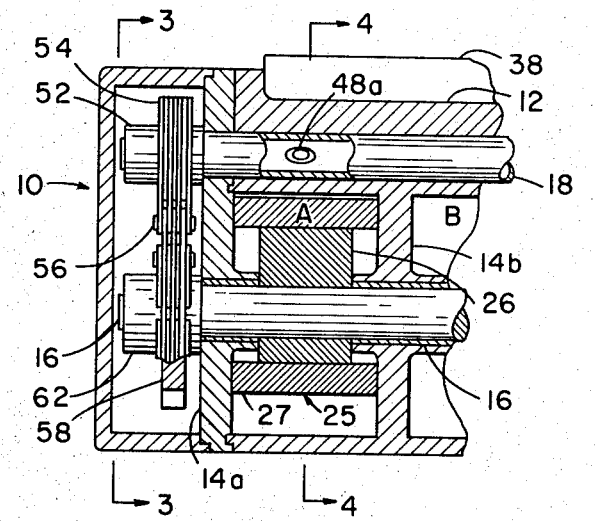
FIG. 2 is a view along 2—2 of FIG. 1.

Referring to FIGS. 1 and 2 there is shown rotary piston steam engine 10 consisting of a housing 12 containing four cylinders formed by dividing walls 14a, 14b, 14c, 14d, and 14e, engine shaft 16, rotary valve 18, and steam inlet port 22. For convenience, the cylinders are designated A, B, C and D, as illustrated.

Figure 4:
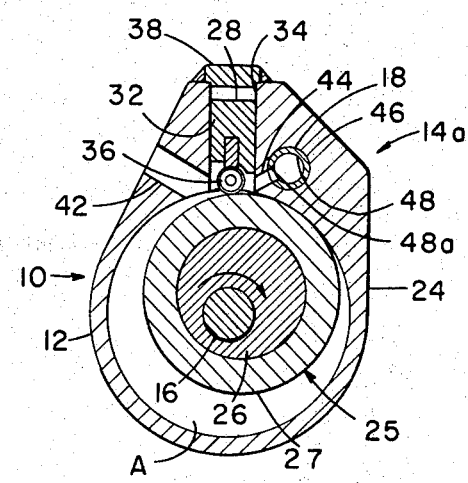
FIG. 4 is a view along 4—4 of FIG. 2.

Housing 12 may be constructed from cast metal with spaces, as illustrated, to accommodate the various operative parts of the engine which are described. Each of the cylinders, as shown for cylinder A in FIG. 4, contains a rotor assembly 25 consisting of a rotor 26 eccentrically mounted on shaft 16 and supporting an annular roller 27. From the side view shown in FIG. 4, the cylinders are exactly circular, so that it is seen that roller 27 at its largest diameter of eccentricity wipes the surface of the cylinder wall as the former rotates. As is understood in the art, this in effect produces a rotating volume. A curtain valve 28, as seen in FIG. 4, consisting of a sliding block 32 in a slot 34, and an attached roller 36 is biased downwardly by a spring member (not shown) between the upper surface of block 32 and the inner surface of a cover 38. As rotor assembly 25 rotates, roller 36 is in continuous contact with the outer surface of eccentrically mounted roller 27. In the direction of rotation shown in FIG. 4, it is apparent that the fluid trapped in the volume to the right of roller 36 is expelled through an exhaust port 42 while high pressure steam entering by way of an inlet port 44 to the right of roller 36 produces an unbalanced moment about shaft 16 thereby causing its rotation.

In order for rotary engine 10 to function it is readily apparent that the high pressure steam must be admitted to each cylinder through a precise angle of rotation. After the steam enters during this charging period, entry to inlet port 44 must then be closed, so that expansion of the steam continues until exposed to outlet port 42 at exhaust pressure.

To accomplish this precise inlet valving, housing 12 is supplied with a cylindrical passageway 46 which extends the whole length of the former. Adjacent each of cylinders A–D and inlet port such as already noted port 44 into cylinder A is provided. A rotatable tube 48 already referred to as rotary valve 18 is fitted into opening 46. Adjacent each port, tube 48 is provided with a slotted opening such as opening 48a which extends annularly the angle of rotation during which steam is to enter the cylinder. Eccentric rotor assembly 25 is synchronized with tube 48 for this purpose, in a manner to be described below. In the remaining cylinders, the various rotors, and the slots in tube 48, are staggered so that there is generally a uniform or even distribution of power to shaft 16.

Figure 3:
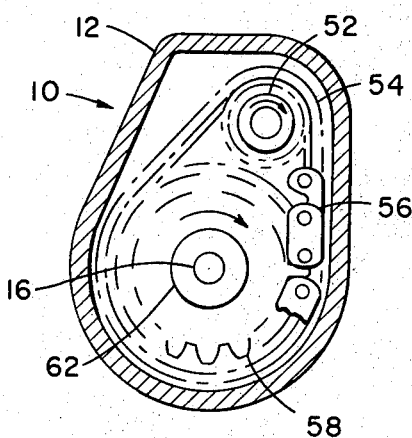
FIG. 3 is a view along 3—3 of FIG. 2.

As illustrated in FIGS. 1, 2 and 3 rotary valve 18 terminates at one end in a stub 52 supporting a toothed wheel 54 which is linked by a chain 56 to a toothed wheel 58 mounted on a stub 62 attached to the end of power shaft 16. The opposite end of shaft 16 (not shown) extends out of engine housing 12 and delivers the shaft power of engine 10.

Referring to FIG. 2 it will be noted that eccentric rotor assembly 25 is rectangular in cross-section and fits closely the similar shape of the cylinder walls. In such a way the pressure of the high pressure steam is largely utilized to rotate shaft 16.

In the operation of engine 10, high pressure steam is delivered to engine inlet port 22 by way of a suitable conduit (not shown) and distributed by way of rotary valve 18 to each of cylinders A–D in proper sequence, by slots in tubes 48. The steam expands in the cylinders causing the rotation of shaft 16, and then exhausts to a lower pressure through the various exhaust ports (e.g. 42 for cylinder A) into a common exhaust manifold (not shown). The ratio of drive between shaft 16 and valve 18 is shown as one to two in which case slotted openings 48a of the rotatable tube 48 opens to the inlet port 44 twice per revolution. Curtain valve 28 blocks admission of steam to the engine cylinder upon the second undesired exposure. In the event of a one to one ratio drive this blocking is not required. Lubrication of the moving parts is provided by the working fluid itself.

I claim:
1. A rotary piston vapor engine comprising:
   (a) means forming at least one cylinder and an inlet port to said cylinder;
   (b) a rotatable power shaft passing through said cylinder;
   (c) eccentric rotor means mounted on said shaft for sweeping at maximum eccentricity a defined volume during rotation thereof;
   (d) rotating valve means carrying high pressure gaseous fluid within said forming means for cyclically exposing said inlet port to said fluid for delivery to said cylinder, said rotating valve means being a cylindrical tube open on one end for receiving said fluid and uninterruptedly slotted in a portion of the circumference thereof for the aforesaid cyclical exposure of fluid to said inlet port;
   (e) means for synchronizing rotation of said valve means with said shaft and eccentric rotor means so as to supply fluid to said cylinder during a portion of the time in the rotation of said rotor means to cause an unbalanced moment on said shaft in the direction of rotation;
   (f) an exhaust port in said forming means to discharge at lower pressure the fluid in said cylinder after expansion thereof; and
   (g) curtain valve means in said forming means extending into said cylinder riding on the outer surface of said rotor means to separate said exhaust port from said inlet port, said curtain valve means reciprocating during rotation of said rotor means and cylically blocking and unblocking said inlet port to seal off said inlet port from said cylinder during expansion therein of said fluid.

2. The engine of claim 1 having a plurality of cylinders in a row, each cylinder having a separate inlet port, said valve means extending past the inlet port to each of said cylinders.

3. The engine of claim 2 in which said rotating means is slotted adjacent each of the inlet ports in a different portion of the circumference so that in all cylinders the eccentric rotor means receives unbalanced moments at different intervals of time.

References Cited
UNITED STATES PATENTS

| | | | |
|---|---|---|---|
| 899,814 | 9/1908 | Taylor | 91—58 X |
| 901,813 | 10/1908 | Moses | 91—102 |
| 927,781 | 7/1909 | Farrow | 91—102 X |
| 1,968,537 | 7/1934 | Plato | 91—103 |
| 2,000,984 | 5/1935 | Plato | 91—103 X |
| 2,869,516 | 1/1959 | Heiman | 123—14 X |
| 2,966,898 | 1/1961 | Rydberg et al. | 91—98 X |
| 3,062,435 | 11/1962 | Bentele | 230—158 X |

EVERETTE A. POWELL, Jr, Primary Examiner

U.S. Cl. X.R.
418—126, 210, 225